(12) United States Patent
Christensen et al.

(10) Patent No.: US 11,456,886 B2
(45) Date of Patent: Sep. 27, 2022

(54) PARTICIPANT IDENTIFICATION IN MIXED MEETING

(71) Applicant: Lenovo (Singapore) Pte. Ltd., Singapore (SG)

(72) Inventors: Tobias Christensen, San Francisco, CA (US); Matthew William Fardig, Boonville, IN (US); Philip L. Childs, Fort Wayne, IN (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/834,707

(22) Filed: Mar. 30, 2020

(65) Prior Publication Data

US 2021/0306170 A1 Sep. 30, 2021

(51) Int. Cl.
*G06F 15/16* (2006.01)
*H04L 12/18* (2006.01)
*H04L 65/403* (2022.01)
*G06F 16/23* (2019.01)

(52) U.S. Cl.
CPC ...... *H04L 12/1822* (2013.01); *G06F 16/2379* (2019.01); *H04L 65/403* (2013.01)

(58) Field of Classification Search
CPC .................. H04L 12/1822; H04L 65/403
See application file for complete search history.

(56) References Cited

U.S. PATENT DOCUMENTS

| | | | |
|---|---|---|---|
| 10,931,918 B1* | 2/2021 | Griffin | G06V 40/172 |
| 2009/0210491 A1* | 8/2009 | Thakkar | H04L 12/1822 709/204 |
| 2013/0147903 A1* | 6/2013 | Weiser | H04L 65/1053 348/E7.083 |
| 2019/0273767 A1* | 9/2019 | Nelson | H04M 7/0027 |

* cited by examiner

*Primary Examiner* — Suraj M Joshi
*Assistant Examiner* — Jaren Means
(74) *Attorney, Agent, or Firm* — Ference & Associates LLC

(57) ABSTRACT

One embodiment provides a method, including: supporting, using a meeting application of an information handling device, a mixed meeting, wherein the mixed meeting comprises participants originating from at least two connection mediums; attempting, using a processor, to determine the identities of each of the participants in the mixed meeting; and providing an indication of each of the determined identities to at least one of the participants. Other aspects are described and claimed.

16 Claims, 3 Drawing Sheets

PARTICIPANT IDENTIFICATION IN MIXED MEETING

BACKGROUND

Individuals frequently utilize information handling devices ("devices"), for example laptop and/or personal computers, tablet devices, smart phones, and the like, to participate in remote meetings. More particularly, an individual may utilize their device to connect to these remote sessions via a meeting application. Using the meeting application, an individual may interact and communicate with other meeting attendees (e.g., via audible input, text input, a combination thereof, etc.), some or all of which may be located in a different geographic location.

BRIEF SUMMARY

In summary, one aspect provides a method, comprising: supporting, using a meeting application of an information handling device, a mixed meeting, wherein the mixed meeting comprises participants originating from at least two connection mediums; attempting, using a processor, to determine the identities of each of the participants in the mixed meeting; and providing an indication of each of the determined identities to at least one of the participants.

Another aspect provides an information handling device, comprising: a processor; a memory device that stores instructions executable by the processor to: support, using a meeting application, a mixed meeting, wherein the mixed meeting comprises participants originating from at least two connection mediums; attempt to determine the identities for each of the participants in the mixed meeting; and provide an indication of each of the determined identities to at least one of the participants.

A further aspect provides a product, comprising: a storage device that stores code, the code being executable by a processor and comprising: code that supports, using a meeting application, a mixed meeting, wherein the mixed meeting comprises participants originating from at least two connection mediums; code that attempts to determine the identities of each of the participants in the meeting; and code that provides an indication of the determined identities to at least one of the participants.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
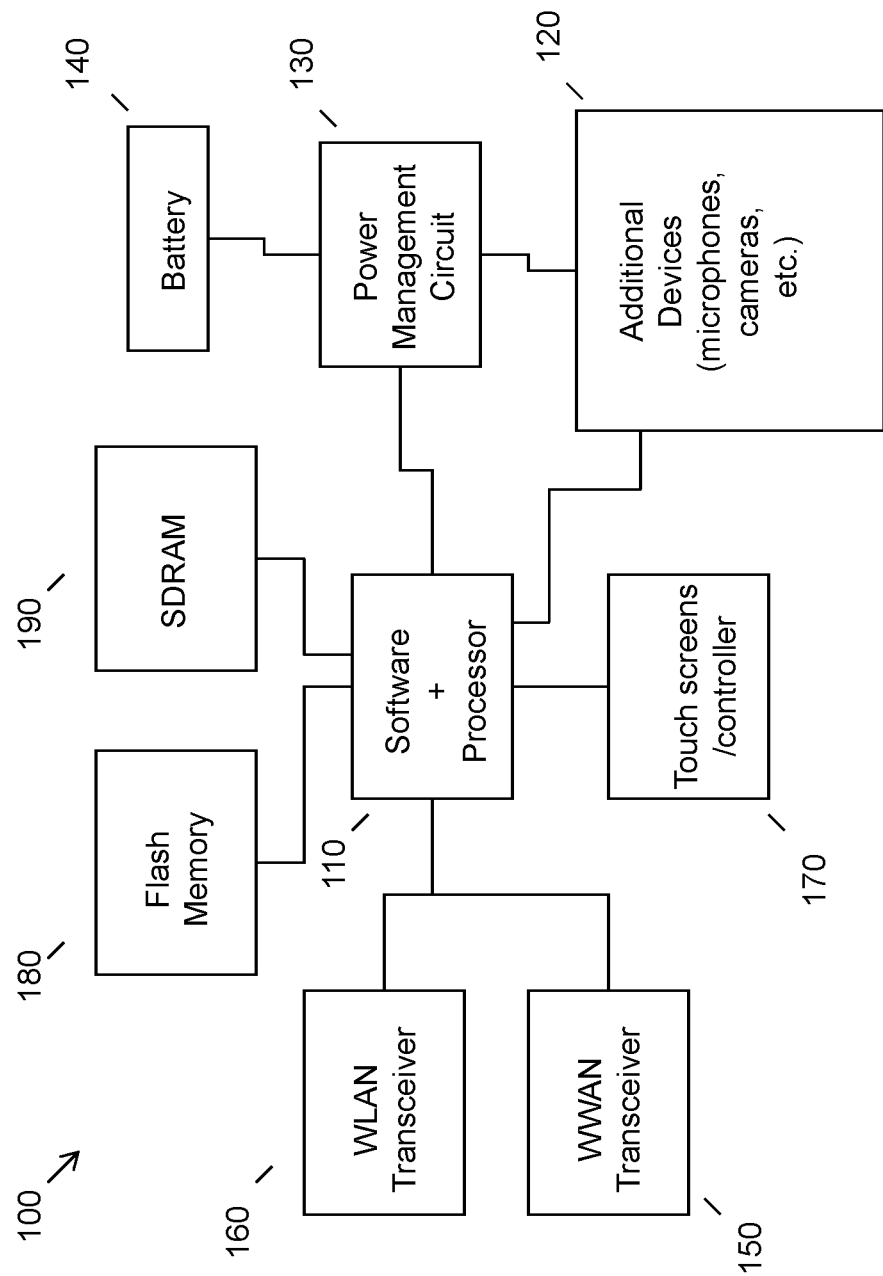
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Mixed meetings are those in which participants may connect to the meeting using various connection mediums. Using a SKYPE meeting as an example, one participant may join the meeting through the SKYPE application directly (i.e., by connecting to the SKYPE meeting via the participant's personal SKYPE profile), another participant may join the SKYPE meeting by calling into the meeting using their personal device (e.g., smart phone, etc.), whereas a group of other participants may join the SKYPE meeting by calling in from a shared device (e.g., a conference phone, etc.). SKYPE is a registered trademark of Microsoft Corporation in the United States and other countries.

The diversity of available connection methods allowed for in mixed meetings enables user to join the mixed meeting using a connection medium that works best for their contextual situation. However, this connection flexibility makes it difficult to determine the exact identities of the participants. For example, if a group of participants joins the meeting through a single connection medium (e.g., a conference phone, etc.) then it may be difficult to identify each of the members in the group. Currently, the only solution is to ask each of the unknown participants directly to state their identities, which may be time-consuming and may interrupt the natural flow of the meeting. Additionally, although participant credentials may be shared (e.g., by the participant, by the device a participant is utilizing, etc.), these credentials cannot immediately be presumed to be valid without additional investigation, which is burdensome and oftentimes unfeasible.

Accordingly, an embodiment provides a novel method for discovering the identities of participants in mixed meetings. In an embodiment, a meeting-based application on a device may initiate, or support, a virtual mixed meeting room that participants can access. The participants in this meeting may access the meeting via two or more different connection mediums (e.g., some participants may access the meeting directly via the meeting application, other participants may call into the meeting from their personal device, other participants may call into the meeting using a shared device (e.g., a conference phone), etc.). An embodiment may then utilize one or more different identification methods, as further described herein, to determine the identities of the participants in the meeting. Once these identities are determined, an embodiment may provide an indication of the identities to the meeting organizer and/or to the other participants in the meeting. Such a method may make it easier to identify the participants in mixed meeting environments.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
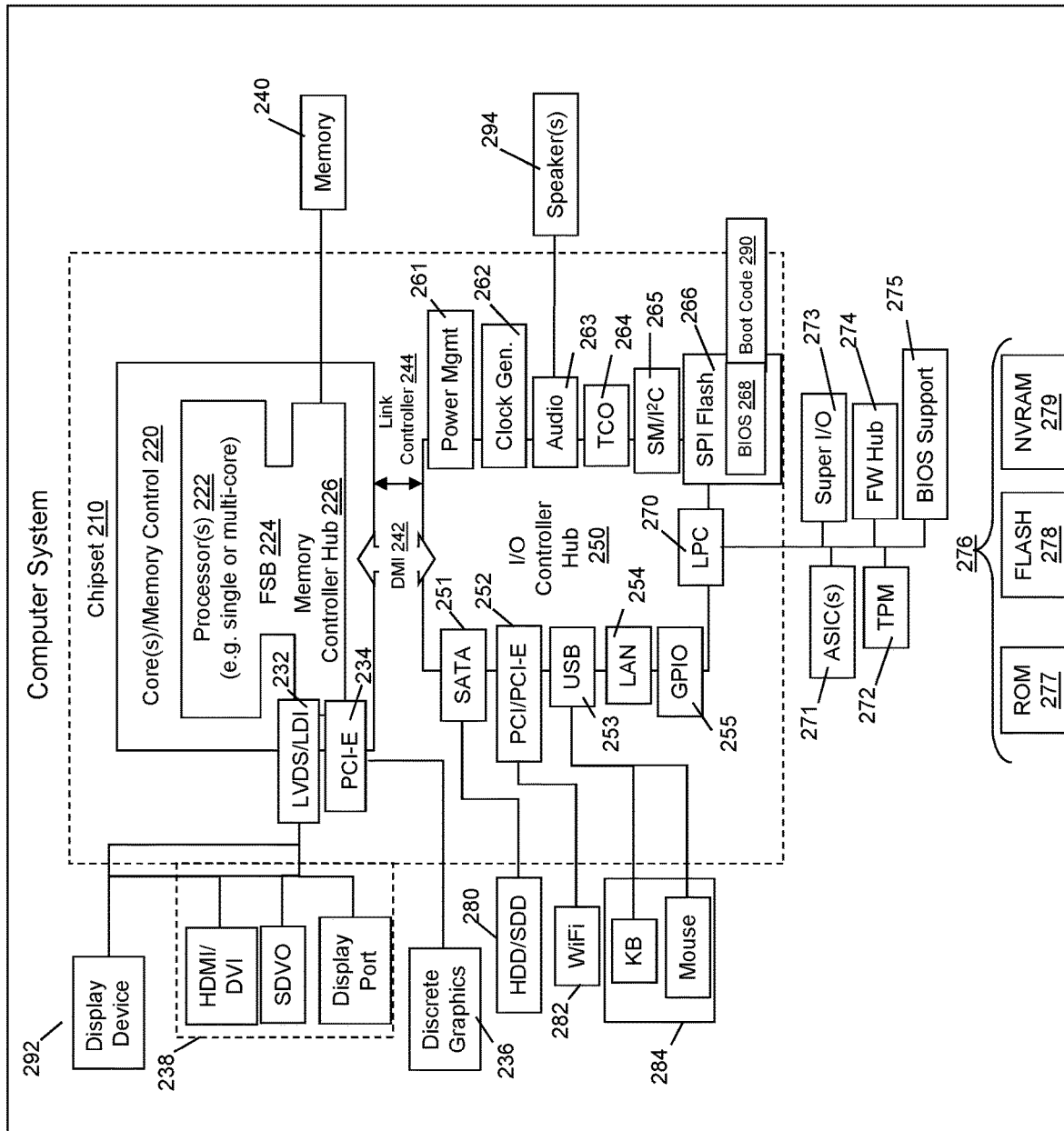
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling circuitry, as for example outlined in FIG. 1 or FIG. 2, may be used in devices capable of supporting mixed meetings. For example, the circuitry outlined in FIG. 1 may be implemented in a smart phone or tablet embodiment, whereas the circuitry outlined in FIG. 2 may be implemented in a laptop.

Figure 3:
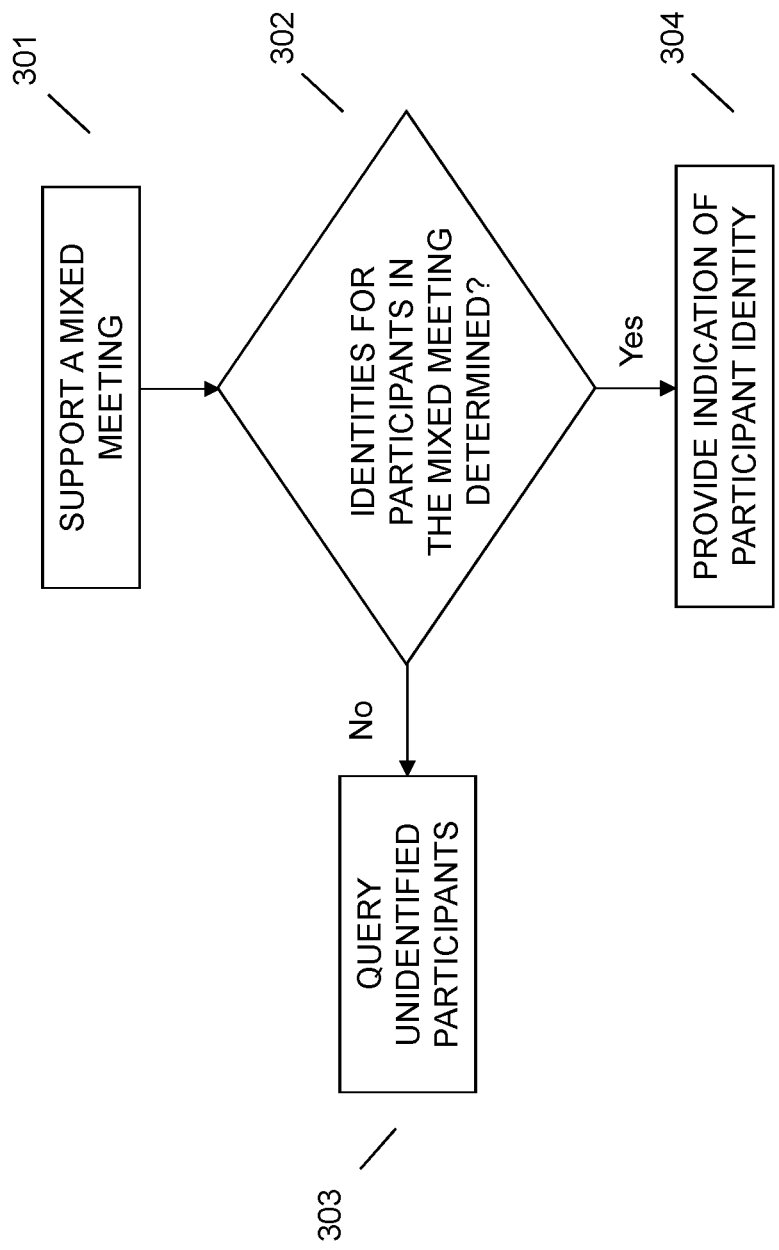
FIG. 3 illustrates an example method of identifying participants in a mixed meeting.

Referring now to FIG. 3, an embodiment provides a method of discovering the identities of participants in mixed meeting environments. At 301, an embodiment may utilize a meeting application resident on a device to support a virtual mixed meeting. As used herein, a mixed meeting may refer to a meeting in which participants may join the meeting from two or more connection mediums. Non-limiting examples of potential connection mediums include: a profile on the meeting application directly, a personal device (e.g., a phone dial-in from their smart phone, tablet, laptop device, etc.), a shared device (e.g., a conference phone of monitor, etc.), and the like. Participants are able to provide input to the mixed meeting depending upon the various input devices available to them (e.g., cameras, microphones, pin-pads, external devices such as a mouse or stylus, a combination thereof, etc.).

At 302, an embodiment may attempt to determine the identities of each of the participants in the mixed meeting.

The determination of these identities may be facilitated using one or more different identity determining techniques. These techniques may include, but are not limited to: recognizing a username/passcode pair provided by the participant, recognizing a pin number provided by the participant, obtaining caller identification information associated with the participant, performing vocal or facial recognition of the participant and comparing the results to known audible and/or facial characteristics of a known individual, identifying device network setting information (e.g. identifying a network utilized by the participant to join the meeting, etc.), identifying device proximity information (e.g., identifying which known device signatures are within a predetermined distance of a conferencing hub device, etc.), identifying an input speed of the participant and comparing the input speed to a known individuals' known input speed, identifying word choices utilized by the participant and comparing the identified word choices to an individuals' known and/or frequently used word choices, and the like.

In an embodiment, to improve the accuracy of the identity determination process and/or to facilitate faster processing of the participants' identities, an embodiment may utilize an expected meeting attendance list. More particularly, rather than comparing obtained identity information against a large identity database (e.g., a company database comprising identity information for each of its employees, etc.), an embodiment may compare the obtained identity information against a much smaller list of expected participants. The expected meeting attendance list may correspond to any source that may provide an indication of the participants likely to be present in a meeting (e.g., a calendar invite, etc.).

An embodiment may cycle through two or more of these techniques until a participants' identity is determined. For example, an embodiment may first attempt to determine a participants' identity based upon their username/password combination. If an embodiment is unable to determine the participant's identity based upon this information, or if this information was never available (e.g., because a participant was not required to provide their username/password, etc.), an embodiment may thereafter resort to voice recognition and/or facial recognition. In an embodiment, a prompt may be provided to the participants' device to better facilitate identity information capture. For example, an embodiment may request the participant to speak their name or say a salutation in order for their voice to be captured for analysis. Similarly, an embodiment may request the participant to turn their face toward a camera in order for characteristics of their face to be captured and analyzed. An embodiment may continue to cycle through the available identity determining techniques until an identity is determined.

In an embodiment, the particular identity determining technique may be based, at least in part, on the connection medium that the participant used to access the meeting. For example, if an embodiment determines that a participant has called into a meeting using their smart phone, an embodiment may first attempt to determine their identity through a voice analysis technique (i.e., because the participant needs to provide voice input to communicate in the meeting) rather than a facial recognition technique.

The following is a list of example scenarios to which the foregoing embodiments may be applied. It is important to note that these scenarios are non-limiting and that the embodiments described herein may be applicable to other scenarios not explicitly described here.

In one scenario, a participant may join the mixed meeting using their laptop computer. The participant may expect to login to the meeting using their credentials. If these credentials are not provided, then an embodiment may utilize the available devices resident on their laptop to attempt to determine the participants' identity. For example, an embodiment may identify a participant from their voice (e.g., using one or more audio analysis techniques, etc.) or from their face (e.g., using one or more video analysis techniques, etc.). In an embodiment, if there are a group of individuals huddled around the laptop device, an embodiment may still use voice or face recognition technologies to attempt to determine the identities of each individual in the group.

In another scenario, a participant may call into a mixed meeting from their phone. If the participant does not provide an identity-defining pin number, or doesn't have such a number, an embodiment may access caller ID information associated with the participant's phone and combine this information with voice detection and analysis to determine the participant's identity. If multiple individuals are in the vicinity of a single phone (e.g. a conference phone, etc.) then the identities of each of the individuals may be identified by voice detection and/or other identity determining technologies described above. The identity determination process in this situation may further tailored by referencing the list of expected meeting participants.

Responsive to not determining, at 302, the identities for each of the mixed meeting participants, an embodiment may, at 303, query the unidentified participants about their identities. More particularly, an embodiment may identify the devices associated with the unidentified participants and transmit a notification to the users of those devices (e.g., using an appropriate notification method for the connection medium, etc.). The notification may query the users about their identity and/or request that they explicitly provide an indication of their identity.

Responsive to determining, at 302, the identities for at least one of the mixed meeting participants, an embodiment may, at 304, provide an indication of the determined identities to one or more of the meeting participants. For example, an embodiment may provide an indication of participant identities to a meeting organizer. Additionally or alternatively, an embodiment may provide indications of participant identities to each participant in the meeting. The participant identities may be presented to the relevant parties using one or more conventional techniques known in the art (e.g., the identities may be displayed on a peripheral portion of the mixed meeting application, the identities may be audibly communicated using a speaker, the identities may be visually communicated in an email communication, etc.). The provision of the indication may be provided at a time before an official start to the meeting or, alternatively, may be provided systematically, throughout the meeting, as participants are identified. In an embodiment, the identities of the participants may be recorded and stored in an accessible storage medium (e.g., stored locally on the meeting origination device or stored remotely on another device or server, etc.). Such a record may be accessed and referred to at a later time if a need arises (e.g., to identify which individuals were present for a past meeting, etc.).

The various embodiments described herein thus represent a technical improvement to conventional methods of determining the identities of participants in mixed meetings. Using these techniques, an embodiment may support a mixed meeting via a meeting application on a device. Participants may join the mixed meeting using virtually any available connection medium. An embodiment may then attempt to determine the identities of each of the participants using one or more identity determining techniques. Responsive to determining an identity of at least one of the participants, an embodiment may provide an indication of the participants' identity to a meeting organizer or to the other participants in the meeting. For those participants whose identities could not be determined, an embodiment may explicitly request them to provide an indication of their identity. Such methods may therefore streamline the identification process for participants in a mixed meeting, thereby allowing the meeting to progress more smoothly and with less interruption.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   supporting, using a meeting application of an information handling device, a mixed meeting, wherein the mixed meeting comprises two or more participants originating from at least two connection mediums and wherein the two or more participants are proximately-situated to connect to the mixed meeting from one of the at least two connection mediums, wherein each of the at least two connection mediums is utilized;
   determining the identities of each of the two or more participants, wherein the determining comprises:
      obtaining, from one or more sources, an expected attendee list for the mixed meeting;
      identifying a chosen connection medium utilized by one of the two or more participants, wherein the chosen connection medium is determined by the one of the two or more participants;
      employing an identity determination technique optimized for the chosen connection medium for each of the two or more participants, wherein the employing comprises cycling through one or more identity determination techniques associated with the connection medium;
      obtaining, from the employing, identity data associated with each of the two or more participants connected to the meeting through a corresponding connection medium;
      comparing the obtained identity data against known identity data for each expected attendee in the expected attendee list; and
      identifying, based on the comparing, whether a match exists between the obtained identity data and the known identity data; and
   providing an indication of each of the determined identities to at least one of the participants.

2. The method of claim 1, wherein the at least two connection mediums are selected from the group consisting of: the meeting application, an individual phone medium, and a shared conference device.

3. The method of claim 1, wherein the identity determination technique comprises a technique selected from the group consisting of: username/password identification, pin number identification, caller identification, voice recognition, facial recognition, device network setting identification, and device proximity information.

4. The method of claim 3, wherein the employing an identity determination technique comprises using at least two of the identity determination techniques.

5. The method of claim 1, wherein the at least one of the participants corresponds to a meeting organizer.

6. The method of claim 1, wherein the at least one of the participants corresponds to each of the participants in the meeting.

7. The method of claim 1, further comprising providing an identification query to each of the participants whose identity could not be determined.

8. The method of claim 1, further comprising recording the determined identities in the mixed meeting in an accessible database.

9. An information handling device, comprising:
a processor;
a memory device that stores instructions executable by the processor to:
support, using a meeting application, a mixed meeting, wherein the mixed meeting comprises two or more participants originating from at least two connection mediums and the two or more participants proximately-situated to connect to the mixed meeting from one of the at least two connection mediums, wherein each of the at least two connection mediums is utilized;
determining the identities for each of the two or more participants, wherein the instructions executable by the processor to determine comprise instructions executable by the processor to:
obtain, from one or more sources, an expected attendee list for the mixed meeting;
identify a chosen connection medium utilized by one of the two or more participants, wherein the chosen connection medium is determined by the one of the two or more participants;
employ an identity determination technique optimized for the chosen connection medium for each of the two or more participants, wherein the employing comprises cycling through one or more identity determination techniques associated with the connection medium;
obtain, from the employing, identity data associated with each of the two or more participants connected to the meeting through a corresponding connection medium;
compare the obtained identity data against known identity data for each expected attendee in the expected attendee list; and
identify, based on the comparing, whether a match exists between the obtained identity data and the known identity data; and
provide an indication of each of the determined identities to at least one of the participants.

10. The information handling device of claim 9, wherein the at least two connection mediums are selected from the group consisting of: the meeting application, an individual phone medium, and a shared conference room medium.

11. The information handling device of claim 9, wherein the identity determination technique comprises a technique selected from the group consisting of: username/password identification, pin number identification, caller identification, voice recognition, facial recognition, device network setting identification, and device proximity information.

12. The information handling device of claim 11, wherein the employing an identity determination technique comprises using at least two of the identity determination techniques.

13. The information handling device of claim 9, wherein the at least one of the participants corresponds to a meeting organizer.

14. The information handling device of claim 9, wherein the at least one of the participants corresponds to each of the participants in the meeting.

15. The information handling device of claim 9, wherein the instructions are further executable by the processor to provide an identification query to each of the participants whose identity could not be determined.

16. A product, comprising:
a storage device that stores code, the code being executable by a processor and comprising:
code that supports, using a meeting application, a mixed meeting, wherein the mixed meeting comprises two or more participants originating from at least two connection mediums and the two or more participants proximately-situated to connect to the mixed meeting from one of the at least two connection mediums, wherein each of the at least two connection mediums is utilized;
code that determines the identities of each of the two or more participants, wherein the code that determines comprises code that:
obtains, from one or more sources, an expected attendee list for the mixed meeting;
identifies a chosen connection medium utilized by one of the two or more participants, wherein the chosen connection medium is determined by the one of the two or more participants;
employs an identity determination technique optimized for the chosen connection medium for each of the two or more participants, wherein the employing comprises cycling through one or more identity determination techniques associated with the connection medium;
obtains, from the code that employs, identity data associated with each of the two or more participants connected to the meeting through their connection medium;
compares the obtained identity data against known identity data for each expected attendee in the expected attendee list; and
identifies, based on the code that compares, whether a match exists between the obtained identity data and the known identity data; and
code that provides an indication of the determined identities to at least one of the participants.

* * * * *